(12) United States Patent
Su

(10) Patent No.: US 8,108,530 B2
(45) Date of Patent: Jan. 31, 2012

(54) COMMUNICATION METHOD CAPABLE OF CONNECTING WITH A COMMUNICATION APPLICATION SERVICE AND GATEWAY THEREOF

(75) Inventor: Chih-An Su, Taipei Hsien (TW)

(73) Assignee: Wistron Corporation, New Taipei (TW)

( * ) Notice: Subject to any disclaimer, the term of this patent is extended or adjusted under 35 U.S.C. 154(b) by 8 days.

(21) Appl. No.: 12/611,077

(22) Filed: Nov. 2, 2009

(65) Prior Publication Data

US 2010/0146125 A1 Jun. 10, 2010

(30) Foreign Application Priority Data

Dec. 10, 2008 (TW) .............................. 97147985 A

(51) Int. Cl.
*G06F 15/16* (2006.01)
(52) U.S. Cl. ........ 709/227; 709/223; 709/220; 709/222; 709/245
(58) Field of Classification Search .................. 709/227, 709/223, 220, 222, 245
See application file for complete search history.

(56) References Cited

U.S. PATENT DOCUMENTS

| | | | |
|---|---|---|---|
| 6,853,720 B2 | 2/2005 | Ramachandran | |
| 7,451,195 B1 * | 11/2008 | Seligmann | 709/220 |
| 2002/0010744 A1 * | 1/2002 | Prell et al. | 709/205 |
| 2003/0202486 A1 * | 10/2003 | Anton et al. | 370/329 |
| 2006/0029039 A1 * | 2/2006 | Ramey et al. | 370/352 |
| 2006/0239277 A1 * | 10/2006 | Gallagher | 370/401 |
| 2006/0251113 A1 * | 11/2006 | Jagadeesan et al. | 370/465 |
| 2009/0316687 A1 * | 12/2009 | Kruppa | 370/352 |
| 2010/0095023 A1 * | 4/2010 | Frank et al. | 709/245 |

FOREIGN PATENT DOCUMENTS

| | | | |
|---|---|---|---|
| CN | 1561629 A | | 1/2005 |
| WO | WO 0106740 | * | 1/2001 |
| WO | WO 0106740 A2 | * | 1/2001 |
| WO | WO 0106740 A2 | * | 1/2001 |

OTHER PUBLICATIONS

Office action mailed on Jun. 24, 2011 for the China application No. 200810183523.9, p. 3 line 4~23.

* cited by examiner

*Primary Examiner* — Lan-Dai Truong

(74) *Attorney, Agent, or Firm* — Winston Hsu; Scott Margo

(57) ABSTRACT

A communication method capable of connecting with a communication application service for an Internet protocol private branch exchange includes establishing a communication channel in the Internet protocol private branch exchange, transmitting a communication message to a channel proxy through the communication channel, and starting to communicate with the communication application service according to the communication message and transmitting the communication message to the communication application service.

8 Claims, 5 Drawing Sheets

US 8,108,530 B2

COMMUNICATION METHOD CAPABLE OF CONNECTING WITH A COMMUNICATION APPLICATION SERVICE AND GATEWAY THEREOF

CROSS REFERENCE TO RELATED APPLICATIONS

This application claims foreign priority under 35 U.S.C 119(a)-(d), based upon Taiwan patent application No. TW 097147985 filed in Taiwan on Dec. 10, 2008.

BACKGROUND OF THE INVENTION

1. Field of the Invention

The present invention provides a communication method capable of connecting with a communication application service and gateway, and more particularly, to a method capable of connecting with a communication application service through a channel proxy and related gateway.

2. Description of the Prior Art

With the highly developed and popular Internet technology, communication becomes more and more convenient. The technology of voice over Internet protocol (VoIP) provides real-time voice communications through the Internet. The VoIP technology not only provides high efficiency voice communication, but also lowers cost when compared with traditional telecommunication systems. In other words, a user uses a VoIP telephone to substitute for the traditional telecommunication system, reducing communication cost greatly.

In general, a VoIP gateway is utilized for a connecting bridge between conventional telecommunication lines and data networks. The VoIP gateway translates analog data into digital data and transmits the digital data into various paths through the Internet after a compressing process. Similarly, a receiving end of a VoIP gateway decompresses the received information packet for the user. On the other hand, for the diversification of real-time instant message techniques, the communication application services, such as MSN Messenger, Google Talk, Skype, etc., have become common tools in daily life. Therefore, the VoIP gateway must be compatible with more communication application services for supporting more communication protocols. However, as a developer develops a new support function, the developer needs to pay high license fees for various communication application services; the developer may not even be able to obtain any related source code techniques or licenses due to technique protection.

SUMMARY OF THE INVENTION

It is therefore a primary objective of the invention to provide a communication method capable of connecting with a communication application service and gateway.

An embodiment of the invention discloses a communication method capable of connecting with a communication application service for an Internet protocol private branch exchange includes establishing a communication channel in the Internet protocol private branch exchange, transmitting a communication message to a channel proxy through the communication channel, and starting to communicate with the communication application service according to the communication message and transmitting the communication message to the communication application service.

An embodiment of the invention further discloses a gateway capable of connecting with a communication application service, in which the gateway comprises an Internet protocol private branch exchange and a channel proxy. The Internet protocol private branch exchange is utilized for building communication bridges between a plurality of network users. The channel proxy comprises a communication socket application programming interface for receiving a communication message transmitted through a communication channel of the Internet protocol private branch exchange; a settings application programming interface for transmitting and receiving the settings information; a control unit for controlling communication with the communication application service according to the communication message; and an application service wrapper for communicating with the communication application service.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
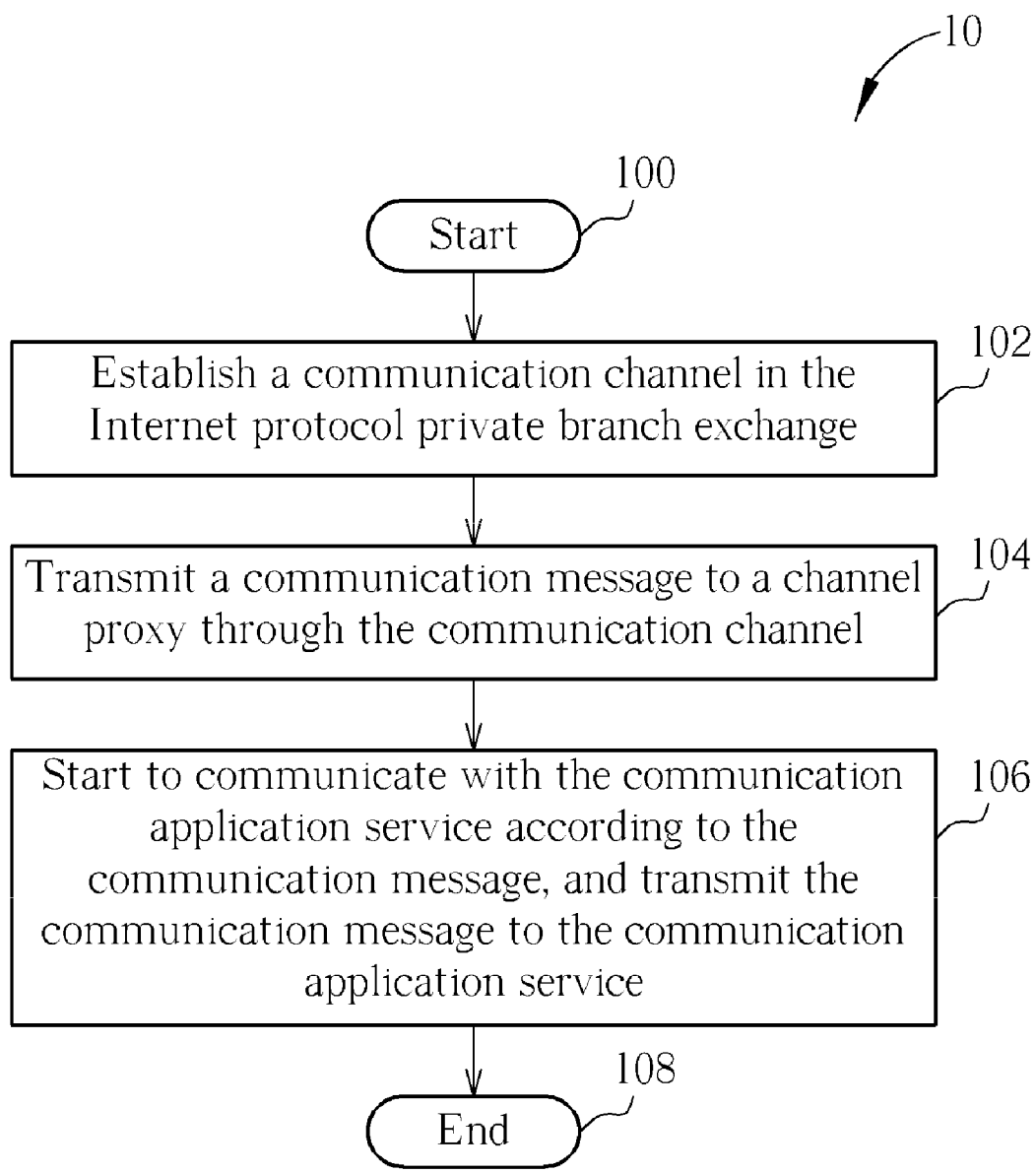
FIG. 1 is a schematic diagram of a procedure according to an embodiment of the invention.

Please refer to FIG. 1. FIG. 1 is a schematic diagram of a procedure 10 according to an embodiment of the invention. The procedure 10 is utilized for an Internet protocol private branch exchange (IP PBX) to realize a communication function with a communication application service. The procedure 10 comprises the following steps:

Step 100: Start.

Step 102: Establish a communication channel in the Internet protocol private branch exchange.

Step 104: Transmit a communication message to a channel proxy through the communication channel.

Step 106: Start to communicate with the communication application service according to the communication message, and transmit the communication message to the communication application service.

Step 108: End.

According to procedure 10, the invention can establish a communication channel in the Internet protocol private branch exchange and transmit a communication message to a channel proxy through the communication channel. Again, the channel proxy can start to communicate with the communication application service according to the communication message, and transmit the communication message to the communication application service. In other words, as one user wants to communicate with another user using a certain communication application service, the invention can connect a communication with the communication application service through operations of the channel proxy.

In the channel proxy, the invention is capable of controlling an application service wrapper to start to communicate with the communication application service according to the communication message. Meanwhile, the application service wrapper notifies the communication application service of implementing a corresponding procedure, such as registration, authorization, dial-up connection, data transmission, etc., according to the command information of the communication message and transmits the communication message to the communication application service. Similarly, the channel proxy can also receive communication messages from the communication application service and inform the Internet protocol private branch exchange of implementing corresponding procedure according to the command information of the received communication messages. After that, the channel proxy transmits the received communication message to the Internet protocol private branch exchange.

Therefore, through the procedure 10, the invention is capable of connecting with communication application services through their application programming interfaces opened to public access for extending compatibility with more communication application services without obtaining related source code techniques or licenses. In such a condition, the invention only needs to utilize application programming interfaces opened to public access without developing for specifications of specific communication protocols. As a result, the invention can integrate related communication application services without concerns about licensing problems, reducing manufacturing cost and developing time.

Figure 2:
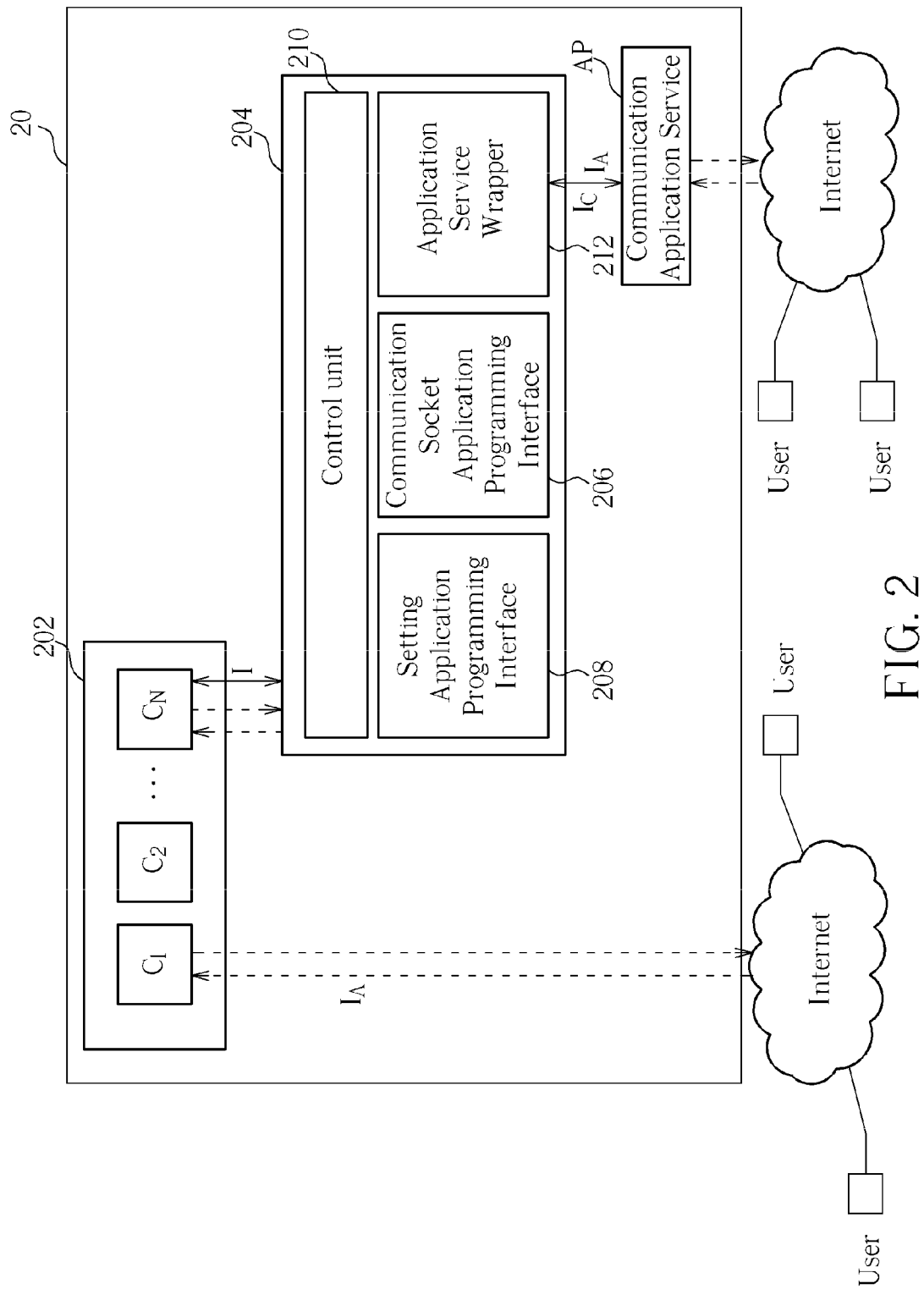
FIG. 2 is a schematic diagram of a gateway according to an embodiment of the invention.

As to the implementation of the procedure 10, please refer to FIG. 2. FIG. 2 is a schematic diagram of a gateway 20 according to an embodiment of the invention. The gateway 20 is utilized for realizing a communication function with a communication application service AP, which includes an Internet protocol private branch exchange 202 and a channel proxy 204. The Internet protocol private branch exchange 202 is utilized for building communication bridges between a plurality of network users, which includes communication channels $C_1$~$C_N$. The channel proxy 204 includes a communication socket application programming interface 206, a settings application programming interface 208, a control unit 210, and an application service wrapper 212. The communication socket application programming interface 206 is utilized for receiving a communication message I transmitted through a communication channel $C_N$ of the Internet protocol private branch exchange 202. The settings application programming interface 208 is utilized for transmitting and receiving setting information $I_S$. The control unit 210 is utilized for controlling communication with communication application service AP according to the communication message I. The application service wrapper 212 is utilized for communicating with the communication application service AP. Preferably, the communication message I includes setting information $I_S$, audio information $I_A$, and command information $I_C$. The setting information $I_S$ includes related setting files of the Internet protocol private branch exchange 202 and database information. The audio information $I_A$ contains audio contents of the users. The audio information $I_A$ can be transmitted to communication application service AP via channel proxy 204. The command information $I_C$ includes request information such as registration, authorization, dial-up connection, data transmission, etc. In detail, the control unit 210 informs application service wrapper 212 of starting to communicate with communication application service AP according to the communication message I from the Internet protocol private branch exchange 202. After that, the application service wrapper 212 informs the communication application service AP of implementing a corresponding procedure, such as registration, authorization, dial-up connection, audio or video encoding and decoding, communication with other users, data transmission, etc., according to command information $I_C$ of the communication message I. Again, the application service wrapper 212 transmits the communication message I to communication application service AP for connecting a communication with the communication application service AP.

Therefore, through the gateway 20, the invention is capable of connecting with communication application services through their application programming interfaces opened to public access for extending compatibility with more communication application services without obtaining related source code techniques or licenses. In such a condition, the invention needs only to utilize the application programming interfaces opened to public access without developing for specifications of specific communication protocols. As a result, the invention can integrate related communication application service without concerns about licensing problems, reducing manufacturing cost and developing time.

Note that, the gateway 20 is an exemplary embodiment of the invention, and those skilled in the art can make alternations and modifications accordingly. For example, the Internet protocol private branch exchange 202 can be realized by an Asterisk Internet protocol private branch exchange having open source code. Therefore, for the Asterisk Internet protocol private branch exchange having modulized functions of OSGI alike, the communication channels $C_1$~$C_N$ can be established with a modular approach. In addition, the communication socket application programming interface 206 can receive the communication message I transmitted through the communication channel by a virtual device or a communication socket. The communication application service AP can be not only any real-time communication application service, such as MSN Messenger, Google Talk, Skype, etc., but also any other communication software or devices, and this is not limited.

Figure 3:
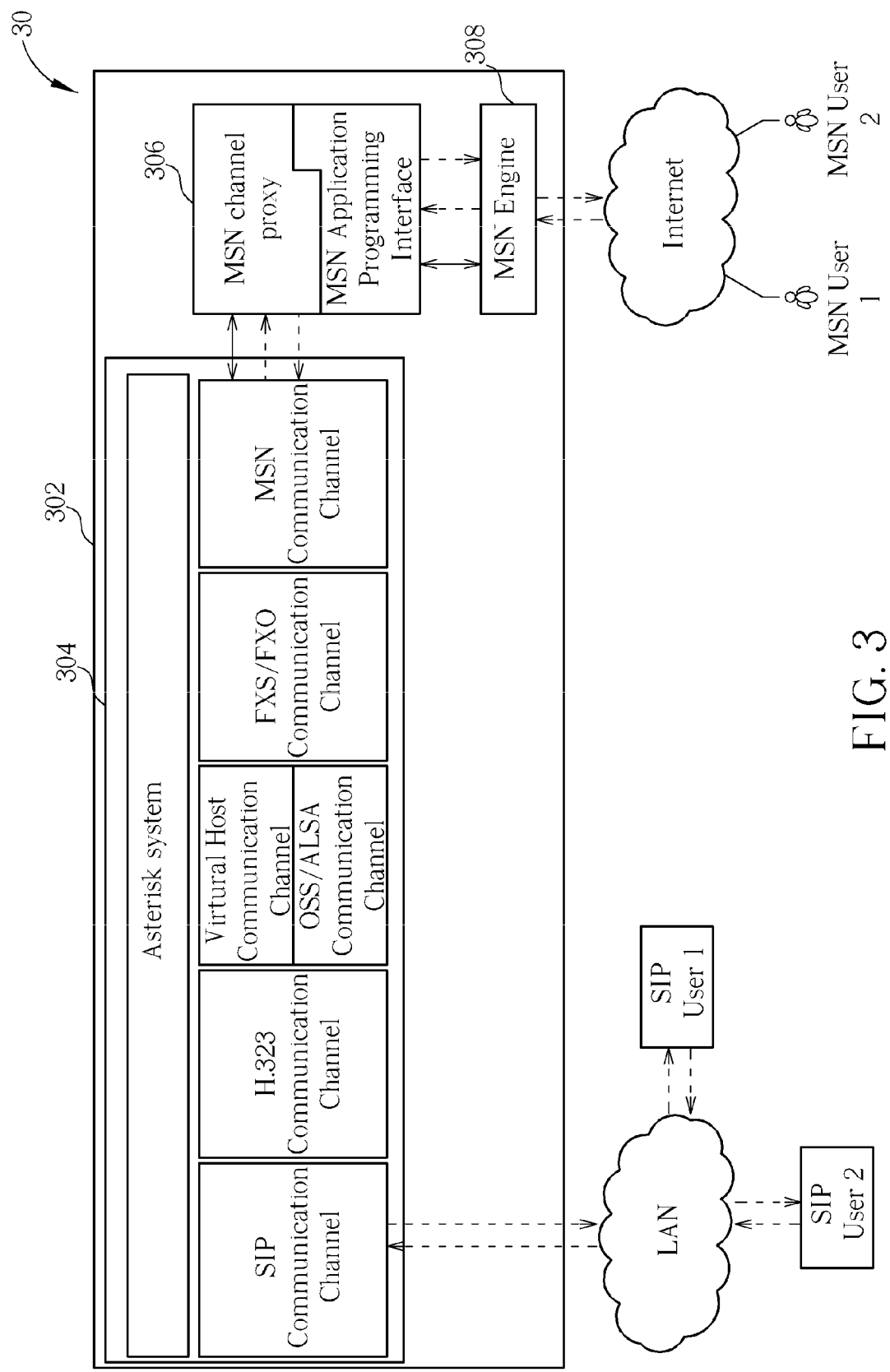
FIG. 3 is a schematic diagram of a VoIP system according to an embodiment of the invention.

The following further elaborates the embodiment of the invention. Take connecting with MSN Messenger for example, suppose a session initiation protocol (SIP) user wants to communicate with an MSN Messenger user. Please refer to FIG. 3. FIG. 3 is a schematic diagram of a VoIP system 30 according to an embodiment of the invention. In FIG. 3, the dotted line indicates direction of audio streams; the solid line indicates transition direction of control information or data. As an SIP user 1 wants to communicate with an MSN user 2, the SIP user 1 can establish a contact with a gateway 302. After that, the communication contents (audio or video data) and related command information are transmitted to an MSN channel proxy 306 through a MSN communication channel in an Internet protocol private branch exchange 304. According to the command information, the MSN channel proxy 306 communicates with the MSN Messenger through related application programming interfaces opened to public access in order to connect a communication, and transmits the communication contents to MSN engine 308.

Figure 4:
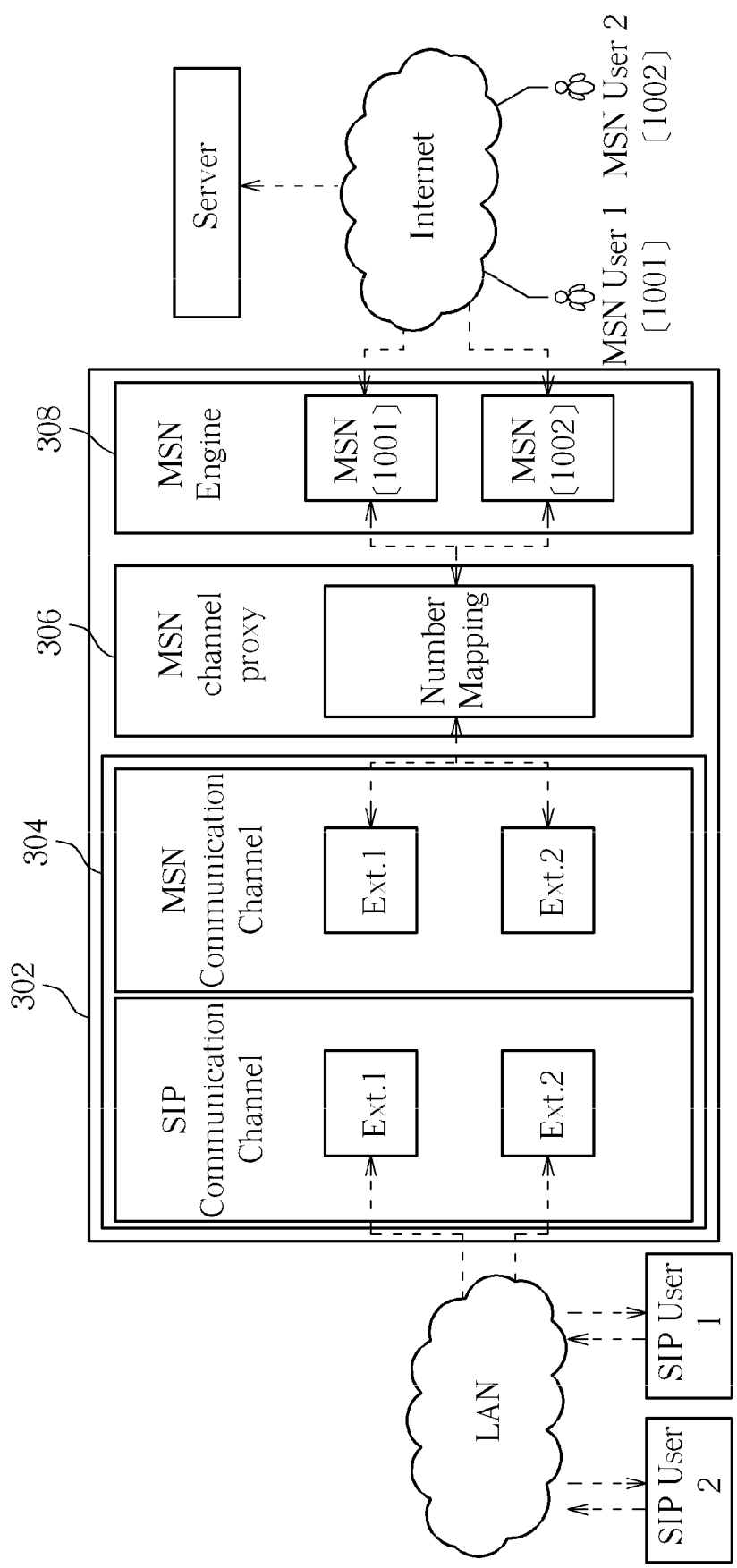
FIG. 4 is a schematic diagram of implementing dial-up connection of the VoIP system according to an embodiment of the invention.

Please further refer to FIG. 4. FIG. 4 is a schematic diagram of implementing dial-up connection of the VoIP system 30 according to an embodiment of the invention. As shown in FIG. 4, the SIP user 1 notifies the Internet protocol private branch exchange 304 of a communicating purpose via local area network. The Internet protocol private branch exchange 304 transmits the command information to MSN channel proxy 306 through MSN communication channels. The MSN channel proxy 306 implements number mapping function for translating to an account of MSN user 2 ([1002] as shown in FIG. 4) according to the command information and notifies the MSN server that the communication target is MSN user 2 (the account is [1002]). Preferably, the MSN channel proxy 306 can realize general number mapping, one-to-multiple, multiple-to-one, or multiple-to-multiple by utilizing an auto-attendant function.

Figure 5:
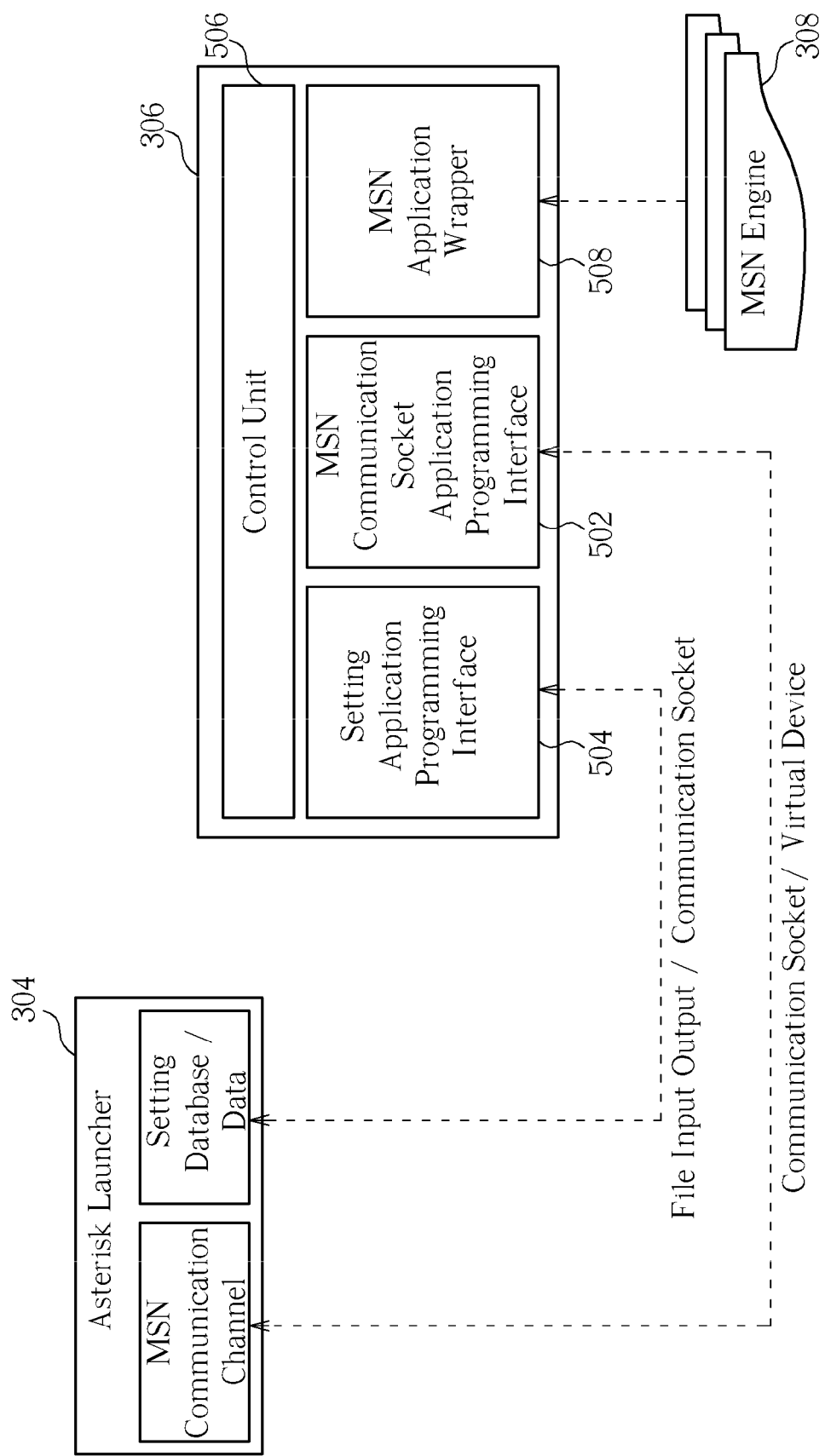
FIG. 5 is a schematic diagram of illustrating relation between Internet protocol private branch exchange and channel proxy according to an embodiment of the invention.

In addition, FIG. 5 is a schematic diagram of illustrating relation between Internet protocol private branch exchange 304 and channel proxy 306 according to an embodiment of the invention. As shown in FIG. 5, the communication contents and related command information can be transmitted between an MSN channel of the Internet protocol private branch exchange 304 and an MSN communication socket application programming interface 502 of the channel proxy 306 through a communication socket or a virtual device. The settings application programming interface 504 can access database or data settings through file input/output methods or a communication socket. The settings application programming interface 504 can share file or database settings with the Internet protocol private branch exchange 304. In addition, the control unit 506 is capable of utilizing the MSN application wrapper 508 to contact with the MSN Messenger for connecting a communication. The MSN application wrapper 508 can be implemented in a command execution file form. Finally, the communication contents can be transmitted to the MSN engine 308 for achieving communication purpose.

In summary, through the invention, a designer is capable of connecting with communication application services through their application programming interfaces opened to public access for extending compatibility with more communication application services without obtaining related source code techniques or licenses. In such a condition, the invention needs only to utilize application programming interfaces opened to public access without developing for specifications of specific communication protocols. As a result, the invention can integrate related communication application service without concerning about license problem, so that reducing manufacturing cost and developing time.

Those skilled in the art will readily observe that numerous modifications and alterations of the device and method may be made while retaining the teachings of the invention.

What is claimed is:

1. A computer capable of connecting with a communication application, comprising:
    a central processing unit (CPU);
    a gateway connecting with a communication application service located inside the gateway, the gateway comprising:
    an Internet protocol private branch exchange building communication bridges between a plurality of network users and including a plurality of communication channels; and
    a channel proxy communicating with the communication application service through application programming interfaces, the channel proxy comprising:
        a communication socket application programming interface receiving a communication message transmitted through a communication channel of the Internet protocol private branch exchange;
        a settings application programming interface transmitting and receiving settings information through a communication channel of the Internet protocol private branch exchange, the settings information including related setting files of the Internet protocol private branch exchange for establishing communication between the Internet protocol private branch exchange and the communication application service;
        a control unit controlling communication with the communication application service according to the communication message transmitted from the Internet protocol private branch exchange, the communication message comprising the settings information; and
        an application service wrapper transmitting the communication message to communication application service and used for establishing communication connection with the communication application service;
    wherein the communication application service includes an application programming interface which is different from the setting application programming interface and the communication socket application programming interface and which is opened to public access so that the application programming interface is opened to public access without developing for specifications of specific communication protocols.

2. The computer of claim 1, wherein the communication socket application programming interface receives the communication message transmitted through the communication channel by a virtual device.

3. The computer of claim 1, wherein the communication socket application programming interface receives the communication message transmitted through the communication channel by a communication socket.

4. The computer of claim 1, wherein the communication message comprises command information, audio information, and the settings information.

5. The computer of claim 1, wherein the control unit transmits the communication message to the application service wrapper from the communication socket application programming interface.

6. The computer of claim 1, wherein the control unit informs the application service wrapper of starting to communicate with the communication application service.

7. The computer of claim 1, wherein the application service wrapper communicates with a communication application service engine.

8. The computer of claim 1, wherein the application service wrapper informs the communication application service of implementing a corresponding procedure according to command information of the communication message, and transmitting the communication message to the communication application service.

* * * * *